Aug. 4, 1959
W. L. HUDSON
2,897,913
GAS SEPARATOR AND ELIMINATOR
Original Filed Aug. 15, 1955
2 Sheets-Sheet 2
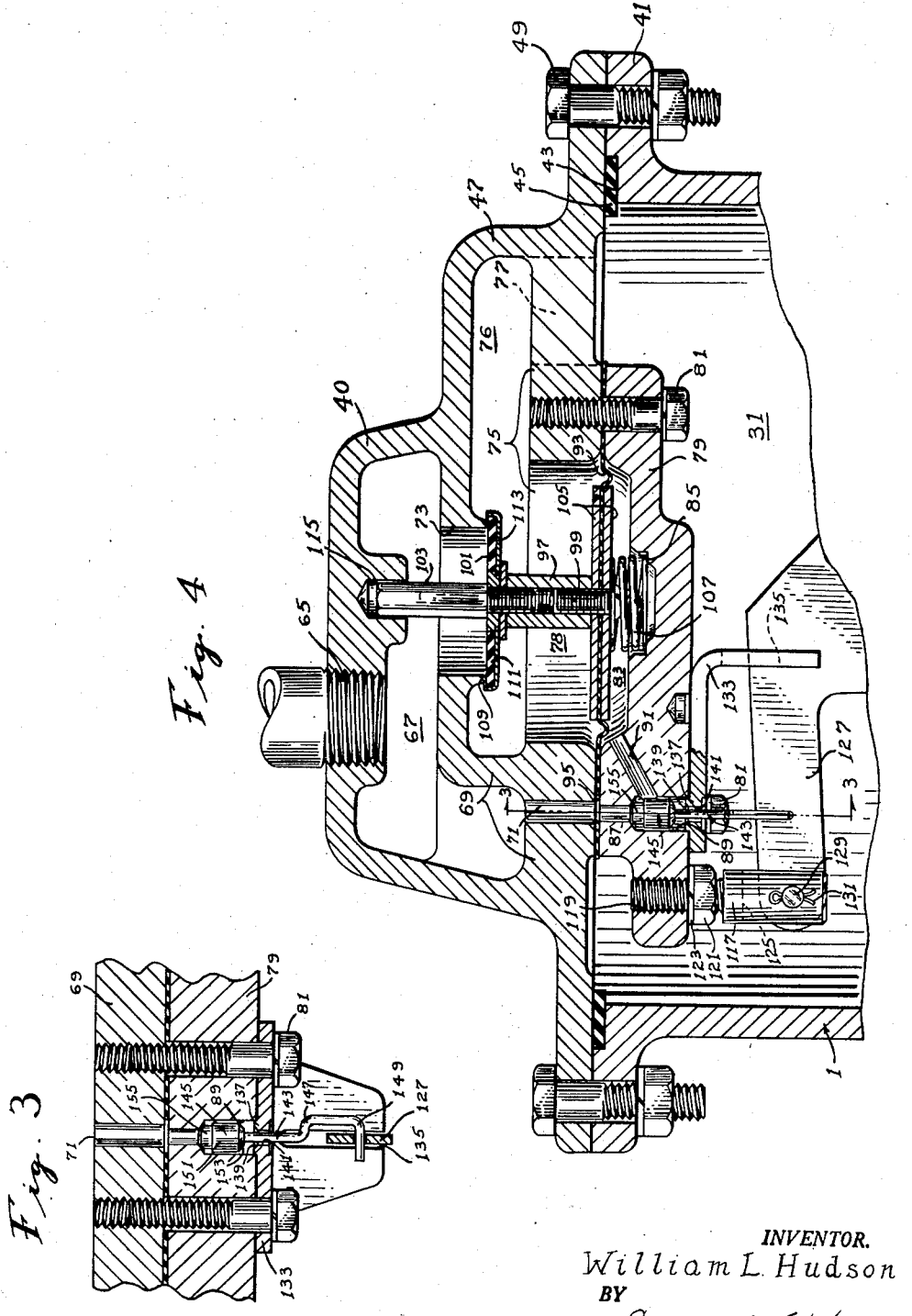
INVENTOR.
William L. Hudson
BY
Edmund W E Kamm
ATTORNEY

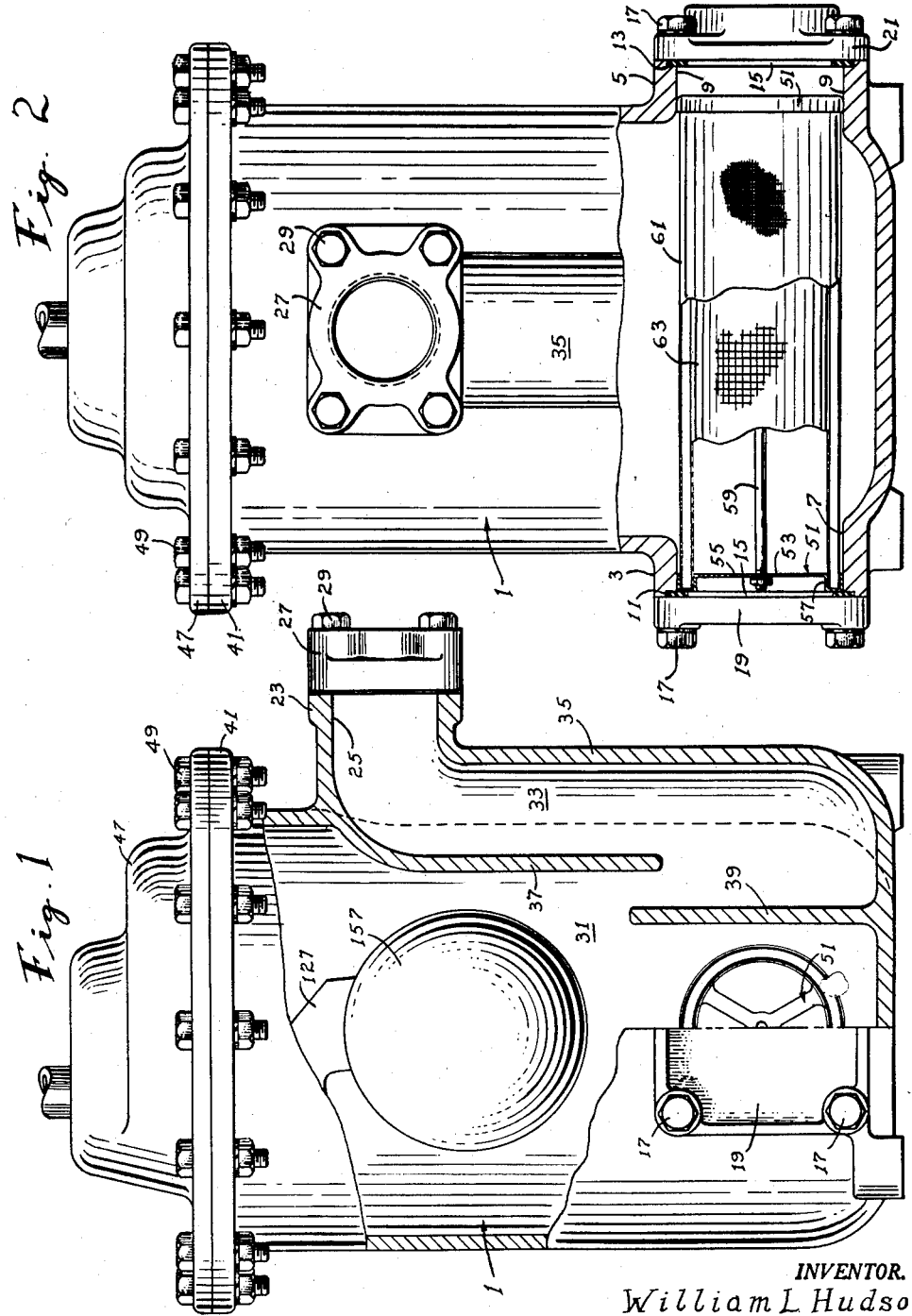

United States Patent Office 2,897,913
Patented Aug. 4, 1959

2,897,913

GAS SEPARATOR AND ELIMINATOR

William L. Hudson, Fort Wayne, Ind., assignor to Tokheim Corporation, Fort Wayne, Ind., a corporation of Indiana Original application August 15, 1955, Serial No. 528,489. Divided and this application August 21, 1956, Serial No. 605,921

6 Claims. (Cl. 183—2.5)

This invention relates to a gas separator and eliminator (hereinafter called a separator) for use with meters particularly on tank trucks.

It is an object of the invention to provide a device of the kind described which is capable of continuously separating and eliminating small amounts of gas which may be entrained in the product.

It is also an object of the invention to provide a device which is capable of preventing the operation of the meter when large amounts of gas are introduced in the line as by the emptying of a compartment of the truck or by drainage of the lines during an idle period. The device will eliminate such gas slugs which would otherwise register on the meter as though liquid were being passed through it.

It is a further object of the invention to provide a device which will vent gas from the system at substantially the same rate at which it is separated from the liquid.

It is another object of the invention to provide a device which has a separating chamber of adequate size and proper conformation to promote the gravitational separation of small quantities of entrained gas from the liquid as it passes through the chamber.

Still another object of the invention is to provide an inlet strainer for the device which comprises at least two screens of different mesh size arranged so that the incoming liquid will pass through first the coarse and then the fine screen, the screens being mounted so that either one or both screens may be used depending upon the nature of the product being handled.

It is a further object of the invention to provide a strainer structure of the kind described which is easily demountable from the separator body for cleaning, screen replacement or selection.

Yet another object of the invention is to provide a gas separator and eliminator structure in which the outlet of the device is disposed adjacent the top thereof but communicates with the liquid in the device adjacent the bottom of the separation chamber through a channel which is preferably formed integrally with the wall of the chamber.

Another object of the invention is to provide a baffle means between the outer strainer discharge surface and the inlet of the discharge channel to prevent the passage of air laden liquid directly to the channel.

These and other objects will become apparent from a study of this specification and the drawings which are appended hereto, form a part hereof and in which:

Figure 1 is an elevation viewed from the inlet side of the device with portions broken away to show the baffle structures.

Figure 2 is an elevation viewed from the discharge side with parts broken away to show the strainer structure and mounting.

Figure 3 is a sectional view taken substantially along the line 3—3 of Figure 4 showing the pilot valve structure.

Figure 4 is a sectional view of the upper part of the separator showing the pilot and servo-vent valve structures.

This application is a division of application Serial Number 528,489, filed August 15, 1955.

Referring particularly to Figures 1 and 2, the numeral 1 represents the body of the device and is preferably a casting of generally cylindrical shape, at the lower end of which are formed a pair of radially outwardly directed bosses 3 and 5 which define openings 7 and 9, which are axially aligned. The outer faces of the bosses are recessed at 11 and 13 to receive gaskets 15.

The bosses are drilled and tapped to receive screws 17 which hold a cover plate 19 and a pipe connecting flange 21 in place over the openings 7 and 9 respectively. However, since the bosses are of identical construction, the cover plate and flange may be reversed so the inlet to the body may be connected to lines approaching from one or the other of two opposite directions without rotating the body.

A single outlet boss 23 defines a horizontally directed opening 25, the axis of which is disposed at substantially ninety degrees to that of the openings 7 and 9 when viewed in plan. A pipe connecting flange 27 is connected to the boss by screws 29.

While the opening 25 is disposed adjacent the top of the body, it communicates with the lower end of the interior chamber 31 through the enclosed channel 33 formed by the U-shaped wall 35 and the downwardly extending baffle 37 which terminates below the upper edge of an upwardly extending baffle 39. The latter extends entirely across the chamber as does the baffle 37 so that liquid entering the chamber through the strainer, which is described below, and adjacent baffle 39 will be forced to flow upwardly along 39 whereas liquid flowing out of the chamber will have to move downwardly between baffles 39 and 37, then turn 180 degrees to enter the discharge channel 33.

The body 1 is provided with a top flange 41 which is recessed at 43 to receive a gasket 45 and a flanged cover 47 is joined to the body by means of bolts 49.

*Strainer assembly*

The strainer assembly comprises a pair of identical screen retaining plates 51 each of which includes a central hub portion 53 from which radiate a number of arms 55, preferably three, which support at their outer ends an annular channel 57 which has a U-shaped cross-section and is joined to the arms at top of one leg of the channel so that the channel is open in an axial direction.

The hub is centrally perforated to receive a tie bolt 59 in order to hold the screen retainers in place on the ends of the outer and inner screens 61, 63 respectively. The ends of the screens are preferably sized so that they fit the respective cylinders defined by the inner and outer legs of the channel snugly. The inner screen 63, which is the one first reached by the incoming liquid, is preferably of coarse construction whereas the outer screen 61, which performs the final straining function, is preferably of fine construction. In practice, it has been found that screen 63 may have openings of .0213 inch maximum span while screen 61 may have openings of .006 inch maximum span. The choice of screen size is, of course, not critical.

In the event the liquid being handled is so viscid, either in its natural state or due to low temperatures, that the fine screen 61 materially impedes the flow thereof, the screen assembly may be taken apart and the screen 61 may be removed so that when reinstalled, only the coarse screen will be available to perform the straining function. While the protection afforded the meter is reduced in such case, the coarse screen still prevents the passage of relatively large particles which could seriously damage the meter.

Since the outer diameter of the channel portion is very slightly less than the internal diameter of the openings 7 and 9, the screen may be inserted and removed axially from and through either opening, the choice being normally governed by the position occupied by the plate 19 while by-passing liquid around the screen is substantially prevented.

*Gas venting mechanism*

Referring particularly to Figures 1 and 3, it will be seen that the cover 47 has an outer wall 40 which is provided with a tapped vent opening 65 which may receive a pipe to conduct gas from the opening either to atmosphere or to the top of the storage tank. The opening 65 communicates with a gas venting chamber 67 formed by the cover wall and an inner wall 69 which defines a small gas discharge port 71 and a large gas discharge port 73.

Fixed to the wall 69 and to a lower wall 75, and forming therewith a gas collecting chamber 76, which is in communication with the chamber 31 through ports 77 and has a relatively large opening 78 therein which forms a diaphragm chamber, is a diaphragm plate 79. The plate is mounted by screws 81 and defines a shallow diaphragm chamber 83 which bottoms in a substantially cylindrical spring receiving chamber 85.

Also formed in the plate 79 and extending therethrough so as to communicate with the orifice 71, is a port 87, the lower end of which is provided with a counterbore 89. A channel 91 connects the upper end of the counterbore with the diaphragm chamber 83.

The diaphragm 93 is clamped between the parts 69, 75 and 79 and is perforated in the region of the orifices 71 and 87, as at 95, to permit the discharge of gas.

The diaphragm is affixed to the lower end of the stem 97 by means of a screw 99 while the servo-valve 101 is attached to the upper end of the stem by means of the pilot 103 which is also screwed into the stem. The usual washers 105 are disposed on opposite sides of the diaphragm to support it and a spring 107 rests in the chamber 85 and bears upwardly on the lower washer so as to urge the valve 101 toward its seat 109 to close the port 73. The valve facing 111 is preferably of a synthetic rubber material and is supported in metal cup 113. A guide opening 115 is defined by the cover and receives the pilot 103 to hold the valve in proper alignment with the seat.

A pivot post 117 is adjustably screwed into a threaded opening 119 in the diaphragm plate 79 and is held in adjusted position therein by a lock nut 121 and split washer 123. The lower end of the post is axially slotted at 125 and cross drilled to receive a float arm 127 and a pivot pin 129 which is held in place by a cotter pin 131.

A forked guide plate 133 is mounted on the lower side of the plate 79 by screws 81 and the slot 135 thereof spans the float arm 127 so as to guide it as it pivots about the pin 129.

The plate 133 is also formed with a small boss 137 which enters the counterbore 89, which forms the pilot valve chamber, and is formed with an upwardly directed valve seat 139. A central port opening 141 is formed axially in said boss for the reception of the stem 143 of the pilot valve 145. The lower end of the stem is offset at 147 to clear the float arm, and then is bent laterally at 149 to enter a hole in the float arm. Thus as the float rises and falls with the liquid level in the chamber 31, the valve and stem will be reciprocated.

The valve 145 comprises a head 151 which is preferably made of metal which fits loosely in the counterbore and is formed with a valve member 153 at its lower end which is adapted to contact seat 139. A valve member 155, preferably of synthetic rubber, is fixed to the upper end of the head and is adapted to close the port 87. Thus when the float 157 occupies its uppermost position, valve member 155 will close off all communication between the chamber 31 and the atmosphere through port 87 but valve member 153 will be off its seat so that the fluid pressure in chamber 31 will be applied to the diaphragm chamber 83 through the port 141, the valve 153—139, the counterbore 89 and channel 91.

When the float occupies a position intermediate its extreme positions, both valves 153—139 and 155 will be open so that communication between the chamber 31, the diaphragm chamber 83 and the atmosphere will be established. The degree of restriction of this communication will vary with the position of the valves. Thus when the valve 155 is nearly closed, the escape of gas through the valve from both the chamber 31 and the channel 91 will be restricted whereas when the valve 153—139 is nearly closed the escape of gas from chamber 31, will be restricted while the escape of gas through channel 91 is substantially unhindered. Since the pressure in chamber 31 is applied to the upper surface of the diaphragm through ports 77, it will be seen that this pressure tends to depress the diaphragm and open the servo-valve in opposition to the combined effects of the spring 107 and the pressure applied to the underside of the diaphragm, which tend to close the valve. In addition, the pressure of chamber 31 is applied to the lower side of the valve to tend to hold it closed while atmospheric pressure is applied to the upper, exposed portion of the valve to tend to open it. The resultant effect of these forces determines whether the valve opens or closes or assumes a position intermediate these extremes.

The effective area of the upper surface of the diaphragm must, of course, be greater than that of the underside of the valve 101 or the valve could never open. The proportional relationship of these areas is, as is well recognized, a function of the difference between the normal working pressure in chamber 31 and atmospheric pressure as well as the desired speed of operation of the valve.

*Operation*

Liquid under either pump or gravity pressure is admitted through the inlet flange 21 to the interior of the inner screen 63 from which it passes substantially radially outwardly through the screen 63 and the screen 61 into the chamber 31. The general direction of the flow from the screen into the chamber is upward and direct flow to the discharge channel 33 is prevented by the baffles 37 and 39. Thus any gas entrained in the liquid is afforded the time required for it to separate from the liquid under the action of gravitational and buoyancy forces. Gas free liquid will therefore flow out the channel 33 and to the meter, while the gas will collect in the upper end of the chamber 31 and in chamber 76 to which it passes through ports 77. As the gas collects, the liquid level in chamber 31 will fall and eventually reach a level at which it will no longer support the float 157 in its uppermost position after which the float will begin to fall with the liquid level. If the accumulation of gas is gradual, as in the case that small amounts of gas entrained in the liquid entering the chamber 31, the fall of the float will be gradual and the valve 155 will be opened slightly to permit the escape of a small stream of gas. In such case the pressure reduction in the diaphragm chamber 83 will be minor and the servo-valve will be substantially unaffected.

In the event the accumulation of gas in the chamber 31 is at a greater rate, the float will drop to a lower position and open the valve 155 to a greater degree. Under such conditions the communication passage between the diaphragm chamber 83 and the atmosphere will be less restricted and, since the pressure on the upper surface of the diaphragm is not materially altered while the pressure below is now substantially reduced, the pressure in chamber 76 will, with the atmospheric pressure on the top of the servo valve, overcome the spring and the pressure on the lower side of the valve and diaphragm so that the valve will open port 73 to permit the escape of larger quantities of gas than can escape through valve 155. The amount of valve opening is determined by the amount by which the forces acting to open the valve overbalance those acting to close it. Obviously the force exerted by the spring increases as the spring is compressed and forces acting on the valve itself change as the valve is opened so that the mechanism will attain a position of equilibrium between the fully closed and fully open positions. It should be remembered that some gas is also escaping through the valve 155 under the assumed conditions and that the pressure in 83 is not atmospheric.

If it should occur that the gas enters the separator at a rate which would cause the liquid level to drop to a point at which it fails to support the float, then the float will open valve 155 and channel 91 to the maximum extent while valve 153—139 will be closed. Thus the pressure on the under side of the diaphragm will be atmospheric while full system pressure will be exerted on the upper surface and the forces exerted on the servo-valve mechanism will serve to open it to the fullest extent to vent the maximum possible quantity of gas. With the valve wide open, the pressure in the chamber 31 and the downstream portion of the system are reduced to the point that the meter will not run and consequently all flow of liquid through the meter will stop until the gas condition is rectified.

As pointed out above, the severe gas conditions are usually caused by the complete draining of a truck compartment or other failure of the liquid supply.

It will thus be seen that the apparatus will prevent improper registration of gas as liquid whether the gas be entrained in small or large quantities in the liquid or whether substantially all gas is flowing in the system.

While I have set forth herein a specific embodiment of my invention for purposes of illustration, it is obvious that various changes and alterations may be made in the form, size, and arrangement of the parts of the structure without departing from the spirit of the invention. I do not, therefore, wish to be limited to the specific form of the invention disclosed but desire protection falling fairly within the scope of the appended claims.

What I claim to be new and desire to protect by Letters Patent of the United States is:

1. In a gas separator, the combination of a body and a cover forming a separator and gas venting chamber, said body including bosses disposed on its lower, opposite side portions defining axially aligned exterior openings of similar size and shape, said body including means defining a liquid discharge channel having an inlet adjacent the bottom of the chamber and its outlet at the side of the body near the top of the chamber, a cylindrical strainer disposed with its ends resting within said aligned openings, means for holding the strainer in place and for sealing the joint between the strainer and body and baffle means in the lower portion of said chamber disposed to prevent the direct passage of liquid from the strainer to the inlet of the discharge channel.

2. In a gas separator, the combination of a body and a cover forming a separator and gas venting chamber, said body including bosses disposed on its lower, opposite side portions defining axially aligned exterior openings of similar size and shape, said body including means defining a liquid discharge channel having an inlet adjacent the bottom of the chamber and its outlet at the side of the body near the top of the chamber, a cylindrical strainer disposed with its ends resting within said aligned openings, one of said openings constituting the separator inlet, means for holding the strainer in place and for sealing the joint between the strainer and body and baffle means in the lower portion of said chamber disposed to prevent the direct passage of liquid from the strainer to the inlet of the discharge channel, gas venting port means formed in said cover and float controlled vent valve means for controlling the flow of fluid through said port means.

3. In a gas separator, the combination of a body and a cover forming a separator and gas venting chamber, said body including bosses disposed on its lower, opposite side portions defining axially aligned exterior openings of similar size and shape, said body including means defining a liquid discharge channel having an inlet adjacent the bottom of the chamber and its outlet at the side of the body near the top of the chamber, said discharge channel being disposed substantially equidistantly from said axially aligned openings, a cylindrical strainer disposed with its ends resting within said aligned openings, one of said openings constituting the separator inlet, means for holding the strainer in place and for sealing the joint between the strainer and body and baffle means in the lower portion of said chamber disposed to prevent the direct passage of liquid from the strainer to the inlet of the discharge channel.

4. In a gas separator, the combination of a body and a cover forming a separator and gas venting chamber, said body including bosses disposed on its lower, opposite side portions defining axially aligned exterior openings of similar size and shape, said body including means defining a liquid discharge channel having an inlet adjacent the bottom of the chamber and its outlet at the side of the body near the top of the chamber, a cylindrical strainer comprising an inner relatively coarse screen, an outer relatively fine screen and means for holding said screens as an integral unit in substantially concentric spaced relation with respect to each other, said strainer unit being disposed with its ends resting within said aligned openings, one of said openings constituting the separator inlet, means for holding the strainer unit in place and for sealing the joint between the strainer unit and body and baffle means in the lower portion of said chamber disposed to prevent the direct passage of liquid from the strainer unit to the inlet of the discharge channel.

5. In a gas separator, the combination of a body and a cover forming a separator and gas venting chamber, said body including bosses disposed on its lower, opposite side portions defining axially aligned exterior openings of similar size and shape, said body including means defining a liquid discharge channel having an inlet adjacent the bottom of the chamber and its outlet at the side of the body near the top of the chamber, a cylindrical strainer disposed with its ends resting within said aligned openings, means for holding the strainer in place and for sealing the joint between the strainer and body comprising a cover plate and a pipe connecting flange which constitutes the inlet to said separator and means for interchangeably mounting said flanges on said bosses and baffle means in the lower portion of said chamber disposed to prevent the direct passage of liquid from the strainer to the inlet of the discharge channel.

6. In a gas separator, the combination of a body and a cover forming a separator and gas venting chamber, said body including bosses disposed on its lower, opposite side portions defining axially aligned exterior openings of similar size and shape, said body including means defining a liquid discharge channel having an inlet adjacent the bottom of the chamber, a cylindrical strainer comprising an inner relatively coarse screen, an outer relatively fine screen and means for holding said screens as an integral unit in substantially concentric spaced relation with respect to each other, comprising end caps including a central hub, arms extending radially therefrom and supporting an annular, axially open channel disposed to fit and receive the ends of said screens and means for holding said caps and screens in assembled relation as an integral unit, said strainer unit being disposed with its ends resting within said aligned openings, means for holding the strainer unit in place and for sealing the joint between the strainer unit and body, said means including a pipe connecting flange which serves as an inlet and a cover plate, said pipe connecting flange and cover plate being constructed so as to interchangeably fit said bosses, and baffle means in the lower portion of said chamber disposed to prevent the direct passage of liquid from the strainer unit to the inlet of the discharge channel.

References Cited in the file of this patent

UNITED STATES PATENTS

| | | |
|---|---|---|
| 1,970,843 | Curtis | Aug. 21, 1934 |
| 2,177,330 | Pressler | Oct. 24, 1939 |
| 2,689,623 | Schebler | Sept. 21, 1954 |
| 2,762,306 | Bateman | Sept. 11, 1956 |